(12) United States Patent
Okawara

(10) Patent No.: US 12,728,489 B2
(45) Date of Patent: Sep. 8, 2026

(54) JIG DEVICE AND JIG UNIT

(71) Applicant: SURUGA PRODUCTION PLATFORM CO., LTD., Shizuoka (JP)

(72) Inventor: Shinya Okawara, Shizuoka (JP)

(73) Assignee: SURUGA PRODUCTION PLATFORM CO., LTD., Shizuoka (JP)

( * ) Notice: Subject to any disclaimer, the term of this patent is extended or adjusted under 35 U.S.C. 154(b) by 6 days.

(21) Appl. No.: 19/108,649

(22) PCT Filed: Feb. 13, 2023

(86) PCT No.: PCT/JP2023/004782
§ 371 (c)(1),
(2) Date: Mar. 31, 2025

(87) PCT Pub. No.: WO2024/053128
PCT Pub. Date: Mar. 14, 2024

(65) Prior Publication Data

US 2026/0001179 A1 Jan. 1, 2026

(30) Foreign Application Priority Data

Sep. 5, 2022 (JP) ................................ 2022-140666
Sep. 5, 2022 (JP) ................................ 2022-140675
Feb. 9, 2023 (JP) ................................ 2023-018112

(51) Int. Cl.
*B23Q 1/54* (2006.01)
*B23G 1/00* (2006.01)
(Continued)

(52) U.S. Cl.
CPC ......... *B23Q 1/5406* (2013.01); *B23Q 1/0009* (2013.01); *B23Q 1/035* (2013.01); *B23Q 1/76* (2013.01); *B23Q 3/106* (2013.01)

(58) Field of Classification Search
CPC .... B23Q 1/035; B23Q 1/5406; B23Q 1/0009; B23Q 1/76; B23Q 3/106
See application file for complete search history.

(56) References Cited

U.S. PATENT DOCUMENTS 5,318,005 A 6/1994 Mayer et al.
7,013,544 B2 * 3/2006 Yasuda ................ B23Q 7/1431 82/122

(Continued)

FOREIGN PATENT DOCUMENTS

CN 111390591 A 7/2020
DE 4134273 C2 5/1994

(Continued)

*Primary Examiner* — Seahee Hong
(74) *Attorney, Agent, or Firm* — Leason Ellis LLP; Jordan Garner; Mitsuhiro Haraguchi

(57) ABSTRACT

A jig device of a workpiece in a machine tool includes: a holding mechanism that holds the workpiece in a cantilevered state; and a spindle-direction support mechanism including at least one spindle-direction support member disposed to face the workpiece from a side opposite to a spindle of the machine tool in a spindle direction with respect to the workpiece held in the cantilevered state by the holding mechanism. The spindle-direction support mechanism includes a spindle-direction drive unit that drives the spindle-direction support member in the spindle direction between a spindle-direction support position in contact with the workpiece and a spindle-direction retracted position separated from the workpiece, wherein the spindle-direction support mechanism is configured to be capable of changing a contact position where the spindle-direction support member is in contact with the workpiece on an orthogonal plane orthogonal to the spindle direction.

6 Claims, 6 Drawing Sheets

(51) Int. Cl.

| | |
|---|---|
| ***B23Q 1/00*** | (2006.01) |
| ***B23Q 1/03*** | (2006.01) |
| ***B23Q 1/76*** | (2006.01) |
| ***B23Q 3/10*** | (2006.01) |

(56) References Cited

U.S. PATENT DOCUMENTS

| | | | | |
|---|---|---|---|---|
| 9,649,724 | B2 * | 5/2017 | Oh | B23K 37/0435 |
| 2009/0241751 | A1 * | 10/2009 | Walter | G01N 1/06 83/167 |
| 2014/0015185 | A1 | 1/2014 | Hishikawa | |
| 2015/0266109 | A1 * | 9/2015 | Ogawa | B23Q 1/32 409/172 |
| 2017/0087676 | A1 | 3/2017 | Matake | |
| 2019/0064766 | A1 | 2/2019 | Friebolin et al. | |
| 2020/0094361 | A1 | 3/2020 | Kawabe | |
| 2022/0193839 | A1 | 6/2022 | Sugiura et al. | |

FOREIGN PATENT DOCUMENTS

| | | | | |
|---|---|---|---|---|
| DE | 102015205093 | A1 | 9/2016 | |
| DE | 102016117855 | A1 | 3/2017 | |
| DE | 102016203674 | A1 | 9/2017 | |
| EP | 0507033 | B1 | 2/1995 | |
| JP | 3234434 | A | 10/1991 | |
| JP | 6297222 | A | 10/1994 | |
| JP | 201256050 | A | 3/2012 | |
| JP | 2012144014 | A | 8/2012 | |
| JP | 201414908 | A | 1/2014 | |
| JP | 2014018944 | A | 2/2014 | |
| JP | 2016198835 | A | * 12/2016 | F01D 25/00 |
| JP | 2016198837 | A | 12/2016 | |
| JP | 202044617 | A | 3/2020 | |
| KR | 102361572 | B1 | 2/2022 | |
| WO | 2020209336 | A | 10/2020 | |

* cited by examiner

141
A3
144
A2
143
A1
H
W3
142

JIG DEVICE AND JIG UNIT

CROSS-REFERENCE TO RELATED PATENT APPLICATIONS

This application is a U.S. National Phase Application under 35 U.S.C. § 371 of International Patent Application No. PCT/JP2023/004782 filed on Feb. 13, 2023, which claims the benefit of priority to Japanese Application No. 2022-140675 filed on Sep. 5, 2022, Japanese Application No. 2022-140666 filed on Sep. 5, 2022, and Japanese Application No. 2023-18112 filed on Feb. 9, 2023, the contents of all of which are incorporated herein by reference in their entireties. The International Application was published in Japanese on Dec. 14, 2023 as International Publication No. WO/2024/053128 under PCT Article 21(2).

FIELD OF THE INVENTION

The present invention relates to a jig device of a workpiece held in a cantilevered state and a jig unit for the jig device.

BACKGROUND OF THE INVENTION

JP2014-18944A describes a lower jig device for a six-sided machine tool. The lower jig device includes a lower fixing jig that supports a workpiece on a workpiece support face, and a lower lifting jig provided to be movable up and down. Then, when the lower lifting jig ascends, a workpiece support face of the lower lifting jig is flush with the workpiece support face of the lower fixing jig. Further, when the lower lifting jig descends, the workpiece support face of the lower lifting jig is at a lower level than the workpiece support face of the lower fixing jig.

Citation List

Patent Literature

Patent Literature 1: JP2014-18944A

Technical Problem

When a workpiece, which is an object to be processed, is machined by a machine tool for machining the workpiece, for example, a machine tool called a machining center, the workpiece is held by a jig device. Then, a general-purpose jig device is used for machining workpieces produced in large quantities. On the other hand, a dedicated jig device for each workpiece is used for machining various types of workpieces produced in small quantities. When a dedicated jig device is used as described above, a step of stopping a machine tool and removing a workpiece from the jig device occurs to change a machined face. In addition to the removal step, a step of attaching the removed workpiece to another jig device also occurs. As a result, the machining time is prolonged due to the number of detachment and attachment steps of the workpiece and the stop time of the machine tool. As a result, the machining efficiency of the workpiece is reduced.

SUMMARY OF THE INVENTION

Solution to Problem

A jig device according to one mode is a jig device for a workpiece in a machine tool, the jig device comprising: a holding mechanism that holds the workpiece in a cantilevered state; and a spindle-direction support mechanism including at least one spindle-direction support member disposed to face the workpiece from a side opposite to a spindle of the machine tool in a spindle direction with respect to the workpiece held in the cantilevered state by the holding mechanism, the spindle-direction support mechanism including a spindle-direction drive unit that drives the spindle-direction support member in the spindle direction between a spindle-direction support position in contact with the workpiece and a spindle-direction retracted position separated from the workpiece, wherein the spindle-direction support mechanism is configured to be capable of changing a contact position where the spindle-direction support member is in contact with the workpiece on an orthogonal plane orthogonal to the spindle direction.

In addition, a jig unit according to another mode is a jig unit for a jig device of a workpiece held in a cantilevered state in a machine tool, the jig unit comprising: a spindle-direction support mechanism including at least one spindle-direction support member disposed to face the workpiece from a side opposite to a spindle of the machine tool in a spindle direction with respect to the workpiece held in the cantilevered state, the spindle-direction support mechanism including a spindle-direction drive unit that drives the spindle-direction support member in the spindle direction between a spindle-direction support position in contact with the workpiece and a spindle-direction retracted position separated from the workpiece, wherein the spindle-direction support mechanism is configured to be capable of changing a contact position where the spindle-direction support member is in contact with the workpiece on an orthogonal plane orthogonal to the spindle direction.

Advantageous Effects of Invention

Thus, it is possible to provide a jig device that copes with various machining conditions to be applied to a workpiece and improve the machining efficiency of the workpiece.

DETAILED DESCRIPTION OF THE INVENTION

Hereinafter, exemplary embodiments for carrying out the present invention will be described in detail with reference to the drawings. Note that dimensions, materials, shapes, and relative positions of components described in the following embodiments can be arbitrarily set, and can be changed according to a configuration of a device or a method to which the present invention is applied or various conditions. In addition, unless otherwise specified, the scope of the present invention is not limited to the embodiments specifically described below. Incidentally, in the present specification, a side on which a spindle of a machine tool is disposed corresponds to "up", and the opposite side corresponds to "down".

EXAMPLE

Figure 1:
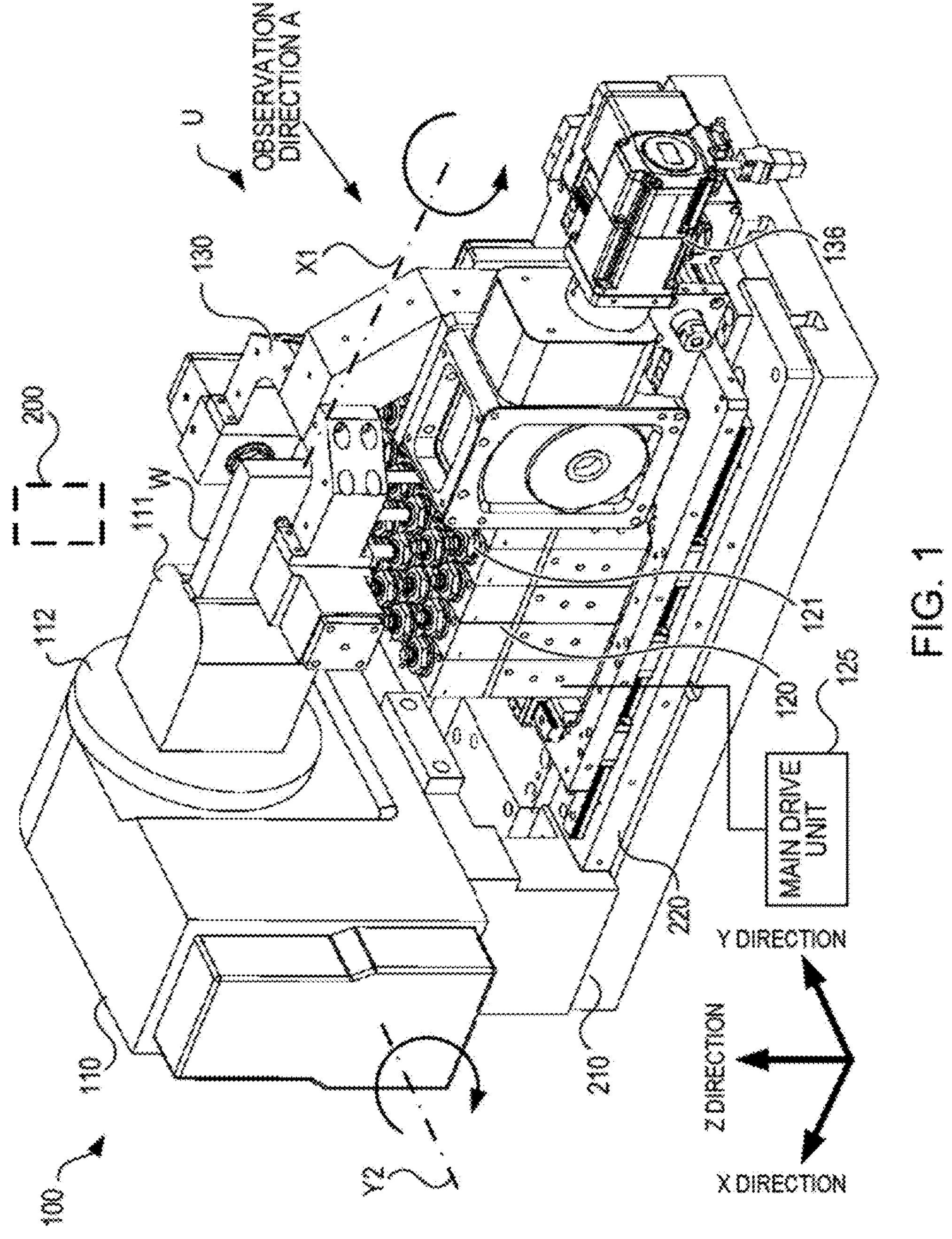
FIG. 1 is a schematic perspective view of a jig device.

A jig device 100 of a workpiece W held in a cantilevered state on a table 210 of a machine tool (not illustrated), that is, above the table 210 will be described with reference to FIG. 1. Incidentally, FIG. 1 is a schematic perspective view of the jig device 100 as viewed obliquely from above. The jig device 100 according to the present embodiment is installed inside the machine tool as an example, and holds and supports the workpiece W, which is an object to be machined, in the cantilevered state.

For example, the machine tool performs drilling, milling, chamfering, or the like on the workpiece W. As a specific example, when the workpiece W is a rectangular parallelepiped, the machine tool is a three-axis machine tool that machines three faces of the workpiece W or a five-axis machine tool that machines five faces of the workpiece W. Further, the machine tool is a vertical machine tool, a horizontal machine tool, or a gate-type machine tool. However, in the following description, an example in which the machine tool is a vertical three-axis machine tool will be mainly described.

The jig device 100 is installed between the table 210 of the machine tool and a spindle 200 of the machine tool indicated by a broken line in FIG. 1. Incidentally, the table 210 may be movable in a state where the jig device 100 is installed. For example, the table 210 may be vertically movable in a direction (hereinafter, also referred to as a Z direction) parallel to a spindle direction of the machine tool, or may be rotatably movable about a rotation axis parallel to the Z direction. Further, the table 210 may be translationally movable in a direction (hereinafter, also referred to as an X direction or a Y direction) orthogonal to the spindle direction, or may be rotationally movable about a rotation axis parallel to the X direction or the Y direction.

The jig device 100 includes a holding mechanism 110 that holds the workpiece W in the cantilevered state, and a jig unit U. Then, the jig unit U includes a main support mechanism 120 as an example of a spindle-direction support mechanism including a spindle-direction support member and the spindle-direction support mechanism to be described later. Further, the jig unit U includes a sub-support mechanism 130 as an example of a second-axial-direction support mechanism including a second-axial-direction support member to be described later.

The holding mechanism 110 holds an end (hereinafter, also referred to as a holding end) of the workpiece W in a first axial direction orthogonal to the spindle direction in the cantilevered state. That is, when the holding mechanism 110 holds a holding end of the workpiece W in the X direction defined as the first axial direction orthogonal to the spindle direction, the other end of the workpiece W in the X direction becomes a free end. On the other hand, when the holding mechanism 110 holds a holding end of the workpiece W in the Y direction defined as the first axial direction orthogonal to the spindle direction, the other end of the workpiece W in the Y direction becomes a free end.

Incidentally, when the holding mechanism 110 holds the holding end of the workpiece W in the X direction, the second-axial-direction support member of the sub-support mechanism 130 faces the workpiece W in the Y direction defined as the second axial direction orthogonal to the spindle direction and the X direction. On the other hand, when the holding mechanism 110 holds the holding end of the workpiece W in the Y direction, the second-axial-direction support member faces the workpiece W in the X direction defined as the second axial direction orthogonal to the spindle direction and the Y direction. However, in the following description, an example in which the holding mechanism 110 holds the holding end of the workpiece W in the X direction as the first axial direction will be mainly described.

Holding Mechanism 110

A chuck 111, which is a holding means for clamping the workpiece W, is attached to the holding mechanism 110. As an example, the chuck 111 can be attached to and detached from the holding mechanism 110. For example, the chuck 111 has a pair of movable claw portions. Then, the pair of claw portions clamps the holding end of the workpiece W, whereby the holding mechanism 110 holds the workpiece W. Alternatively, the chuck 111 may have three or more claw portions. Further, the holding means may be a suction device that sucks and holds the holding end of the workpiece W.

The chuck 111 automatically clamps the workpiece W in the case of so-called external setup in which a machined workpiece W and an unmachined workpiece W are exchanged without stopping the machine tool. For example, the machined workpiece W is carried out of the machine tool by a robot arm. Thereafter, the unmachined workpiece W is carried into the machine tool by the robot arm. Then, the chuck 111 automatically clamps the unmachined workpiece W that has been carried in.

In addition, the holding mechanism 110 includes a rotation mechanism 112 that rotates the workpiece W about one rotation axis line orthogonal to the spindle direction. The rotation mechanism 112 is called, for example, an index table or a rotary table. Specifically, the rotation mechanism 112 rotates the chuck 111 in a range of 360 degrees about a rotation axis line X1 parallel to the X direction as one rotation axis line orthogonal to the spindle direction. Thus, the rotation mechanism 112 can rotate the workpiece W held by the chuck 111 about the rotation axis line X1.

As the rotation mechanism 112 rotates the workpiece W, the machine tool can machine four faces of the workpiece W. For example, when the workpiece W is a rectangular parallelepiped, the machine tool can machine a total of four faces including two faces parallel in the Z direction, which is the spindle direction, and two faces parallel in the Y direction orthogonal to the Z direction. Incidentally, the holding mechanism 110 incorporates a rotary drive means (not illustrated) that drives the rotation mechanism 112. As an example, the rotary drive means includes a drive device that outputs a rotary motion and a rotation transmission mechanism connected to an output shaft of the drive device.

In addition, the holding mechanism 110 may include a first rotation mechanism and a second rotation mechanism. The first rotation mechanism rotates the workpiece W about a first rotation axis line orthogonal to the spindle direction. Then, the second rotation mechanism rotates the workpiece W about a second rotation axis line orthogonal to the spindle direction and the first rotation axis line. For example, the rotation mechanism 112 as the first rotation mechanism rotates the workpiece W about the rotation axis line X1 parallel to the X direction and serving as the first rotation axis line orthogonal to the Z direction which is the spindle direction. Further, the second rotation mechanism (not illustrated) rotates the workpiece W about a rotation axis line Y2 parallel to the Y direction and serving as the second rotation axis line orthogonal to the Z direction and the rotation axis line X1.

Specifically, the second rotation mechanism rotates the holding mechanism 110 by 90 degrees about the rotation axis line Y2. Thus, the free end of the workpiece W held by the chuck 111 faces the spindle 200. That is, the free end of the workpiece W faces the upper side in FIG. 1. Therefore, the machine tool can machine a total of five faces obtained by adding one face on the free end side to the two faces parallel in the Z direction and the two faces parallel in the Y direction. The one face on the free end side faces a side opposite to the holding mechanism 110 before being rotated about the rotation axis line Y2. Incidentally, the holding mechanism 110 incorporates a rotary drive means (not illustrated) that drives the second rotation mechanism.

As an example, the second rotation mechanism rotates the holding mechanism 110 about the rotation axis line Y2 separately from the main support mechanism 120. That is, the second rotation mechanism rotates the holding mechanism 110 without rotating the main support mechanism 120. In the case, the workpiece W is not supported by the main support mechanism 120, but a load during machining in the spindle direction after the rotation is applied toward the holding mechanism 110 that holds the workpiece W in the cantilevered state. Therefore, the workpiece W is supported by the holding mechanism 110, and distortion of the workpiece W due to the load during machining is suppressed.

Spindle-Direction Support Mechanism

Figure 2:
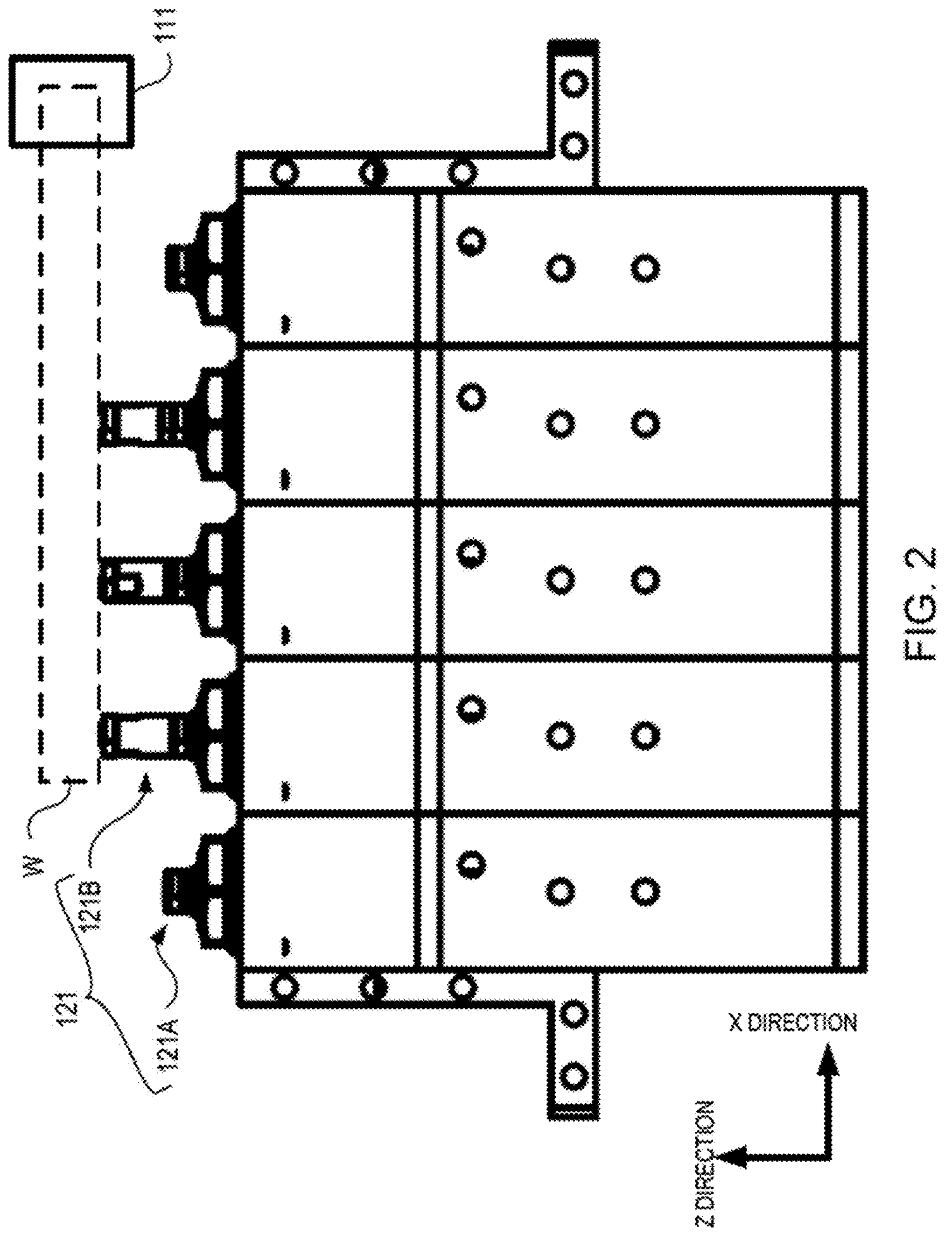
FIG. 2 is a schematic side view of a main support member at a support position.

As illustrated in FIG. 2, the main support mechanism 120 includes at least one main support member 121 as an example of the spindle-direction support member. The main support members 121 are disposed to face the workpiece W held by the holding mechanism 110 from a side opposite to the spindle 200 of the machine tool in the spindle direction. That is, the main support members 121 are located below the chuck 111 of the holding mechanism 110 and on the spindle 200 side with respect to the holding mechanism 110.

In the example of FIG. 1, the main support mechanism 120 includes 25 main support members 121 disposed in a matrix of five lines in the X direction and five lines in the Y direction. Alternatively, the number of the main support members 121 may be one, 24 or less, or 26 or more. In addition, the main support members 121 may be arrayed in another mode such as a houndstooth check, or may be irregularly arrayed.

In addition, the main support mechanism 120 includes a main drive unit 125 (FIG. 1) as an example of a spindle-direction drive unit that drives the main support members 121. The main drive unit 125 drives the main support members 121 between a spindle-direction support position where the main support member 121 is in contact with the workpiece W and a spindle-direction retracted position where the main support member 121 is separated from the workpiece W in the spindle direction. Specifically, the main drive unit 125 causes a main support member 121A at the spindle-direction retracted position illustrated in FIG. 2 to protrude upward toward the spindle-direction support position in the Z direction as the spindle direction. Further, the main drive unit 125 retracts a main support member 121B protruding to the spindle-direction support position illustrated in FIG. 2 downward toward the spindle-direction retracted position in the Z direction.

The driving of the main support members 121 will be described with reference to FIG. 2. Incidentally, FIG. 2 is a schematic side view of the main support members 121, and some of the main support members 121 are at the spindle-direction support position. FIG. 2 illustrates five main support members 121. In addition, distal ends of the main support members 121 are flat, and distal end faces thereof come into contact with the workpiece W. Alternatively, the distal ends of the main support members 121 may have another shape such as a sphere or a hemisphere.

Each of the main support members 121 is a substantially columnar member that is displaced from the spindle-direction retracted position toward the spindle-direction support position. Then, the main support member 121 ascends toward the workpiece W by the action of power supplied from the main drive unit 125. For example, the main support member 121 is driven by electric power, air pressure, hydraulic pressure, a spring force by a compression spring, or the like. As an example, the main support member 121 is a pin or a rod of a linear actuator such as a solenoid actuator, a feed screw, an air cylinder, or a hydraulic cylinder.

As illustrated in FIG. 2, the main support members 121 stop ascending when coming into contact with the workpiece W. Thereafter, the ascent and descent of the main support members 121 are restricted. Thus, the workpiece W held by the chuck 111 in the cantilevered state is supported by the main support members 121. Thereafter, when machining ends, the main support members 121 descend. Then, the descending main support members 121 stop at the spindle-direction retracted position.

The main support mechanism 120 is configured to be capable of changing a contact position where the main support members 121 is in contact with the workpiece W on an orthogonal plane orthogonal to the spindle direction. That is, the main drive unit 125 of the main support mechanism 120 is configured to selectively drive the main support member 121 protruding to the contact position with respect to the workpiece W on an XY plane which is the orthogonal plane orthogonal to the Z direction as the spindle direction.

Specifically, the main support mechanism 120 includes a plurality of main support members 121 disposed at different positions on the orthogonal plane orthogonal to the spindle direction. Then, the plurality of main support members 121 are divided such that at least one main support member 121 is included for each of driving units by the main drive unit 125. As an example, 25 driving units each including one main support member 121 are set in the main support mechanism 120. However, the driving unit can be set so as to include any number of main support members 121. For example, the driving unit can be set so as to include five main support members 121 arranged in a line.

Then, the main drive unit 125 drives the main support members 121 for each of the driving units. For example, when 25 driving units are set, the main drive unit 125 selectively drives the main support members 121 one by one. In addition, when five driving units each including the five main support members 121 arranged in a line are set, the main drive unit 125 selectively drives five main support members 121 five by five.

For example, the main drive unit 125 is controlled by a control device (for example, a processor), which is not illustrated and is an example of a computer included in the machine tool. Then, the main drive unit 125 causes the main support member 121 at a position corresponding to a shape of the workpiece W recognized by the control device to protrude. In the example of FIG. 2, the main drive unit 125 causes three main support members 121 at positions corresponding to the shape of the workpiece W to protrude.

As an example, the control device acquires pin identification information (for example, a pin number) for identifying the main support member 121 to be caused to protrude. The pin identification information can be acquired from a memory as a storage device included in the machine tool or an external storage device provided outside the machine tool. Alternatively, the control device may acquire the pin identification information manually input by an operator. Then, the control device identifies and selects the main support member 121 to be caused to protrude using the pin identification information corresponding to the workpiece W to be machined.

Then, the control device causes the selected main support member 121 to protrude by the main drive unit 125 at a predetermined protrusion timing. Incidentally, the protrusion timing is, for example, a timing when the workpiece W is completely held by the chuck 111, or a timing when the rotation of the chuck 111 holding the workpiece W by the rotation mechanism 112 is completed. Further, the control device causes the main drive unit 125 to retract the selected main support member 121 at a predetermined retraction timing. Incidentally, the retraction timing is, for example, timing at which machining of one face of the workpiece W is completed.

Alternatively, the control device may recognize the shape of the workpiece W by a detection device such as a sensor or an imaging device. In the case, the control device identifies the main support member 121 at a position corresponding to the recognized shape of the workpiece W. Then, the control device causes the identified main support member 121 to protrude by the main drive unit 125 at a predetermined protrusion timing. In addition, the control device causes the main drive unit 125 to retract the identified main support member 121 at a predetermined retraction timing.

As described above, the main support mechanism 120 selects the main support member 121 to be caused to protrude. Thus, the main support member 121 at a position where it is to be in contact with the workpiece W selectively protrudes on the XY plane. Therefore, the main support mechanism 120 can change the contact position where the main support member 121 is in contact with the workpiece W on the XY plane according to the shape of the workpiece W. As a result, the workpiece W to be machined into various shapes can be supported by the same jig device 100.

In addition, when the vicinity of the free end far from the holding end is machined, a downward load is applied to the workpiece W in the cantilevered state with a fixed position as the center. Therefore, the main support member 121 in the vicinity of the free end is lifted to support the free end from below. Thus, the distortion of the workpiece W during machining can be suppressed.

In addition, the jig device 100 includes a first movement mechanism (not illustrated) that moves the main support mechanism 120 on the table 210. The first movement mechanism moves the main support mechanism 120 in the X direction orthogonal to the Z direction as the spindle direction. As an example, the first movement mechanism includes a slider that linearly moves. Then, a stage 220 on which the main support mechanism 120 is placed is fixed relative to the slider, and the both move together. Further, the jig device 100 further includes a second movement mechanism (not illustrated) that moves the main support mechanism 120 in the Y direction orthogonal to the Z direction.

Alternatively, the movement mechanism that moves the stage 220 may be an air-floating movement mechanism that supplies air from below the main support mechanism 120 to move the floating stage 220. In addition, the jig device 100 may include a rotational movement mechanism that rotates the stage 220 about a rotation axis parallel to the spindle direction as the movement mechanism that moves the stage 220. For example, the jig device 100 may include a rotary table on which the stage 220 is placed as the rotational movement mechanism.

Alternatively, the main support mechanism 120 may have one or a small number of main support members 121. In the case, the main support mechanism 120 moves in the X direction and the Y direction orthogonal to the Z direction as the spindle direction. Thus, the main support mechanism 120 can change the contact position where the main support member 121 is in contact with the workpiece W on the XY plane according to the shape of the workpiece W. For example, the movement of the main support mechanism 120 in the X direction and the Y direction is controlled by the control device of the machine tool. Then, when the main support member 121 moves to a position below the workpiece W, the main drive unit 125 drives the main support member 121.

In addition, a waterproof or dustproof cover (not illustrated) is put on the spindle side of the main support mechanism 120 when the workpiece W is machined. As a result, the periphery of the main support member 121 is covered with the cover. Therefore, it is possible to suppress liquid such as water or dust such as chips from accumulating in the periphery of the main support member 121.

In addition, a through-hole is formed in the cover at a position corresponding to the main support member 121. That is, through-holes are formed in the cover in a number corresponding to the number of the main support members 121. Then, the distal ends of the main support members 121 are exposed from the through-holes, respectively. Therefore, the main support member 121 driven by the main drive unit 125 protrudes through the through-hole. As a result, an upper portion of the main support member 121 at the spindle-direction support position is exposed from the through-hole.

Second-Axial-Direction Support Mechanism

Figure 3:
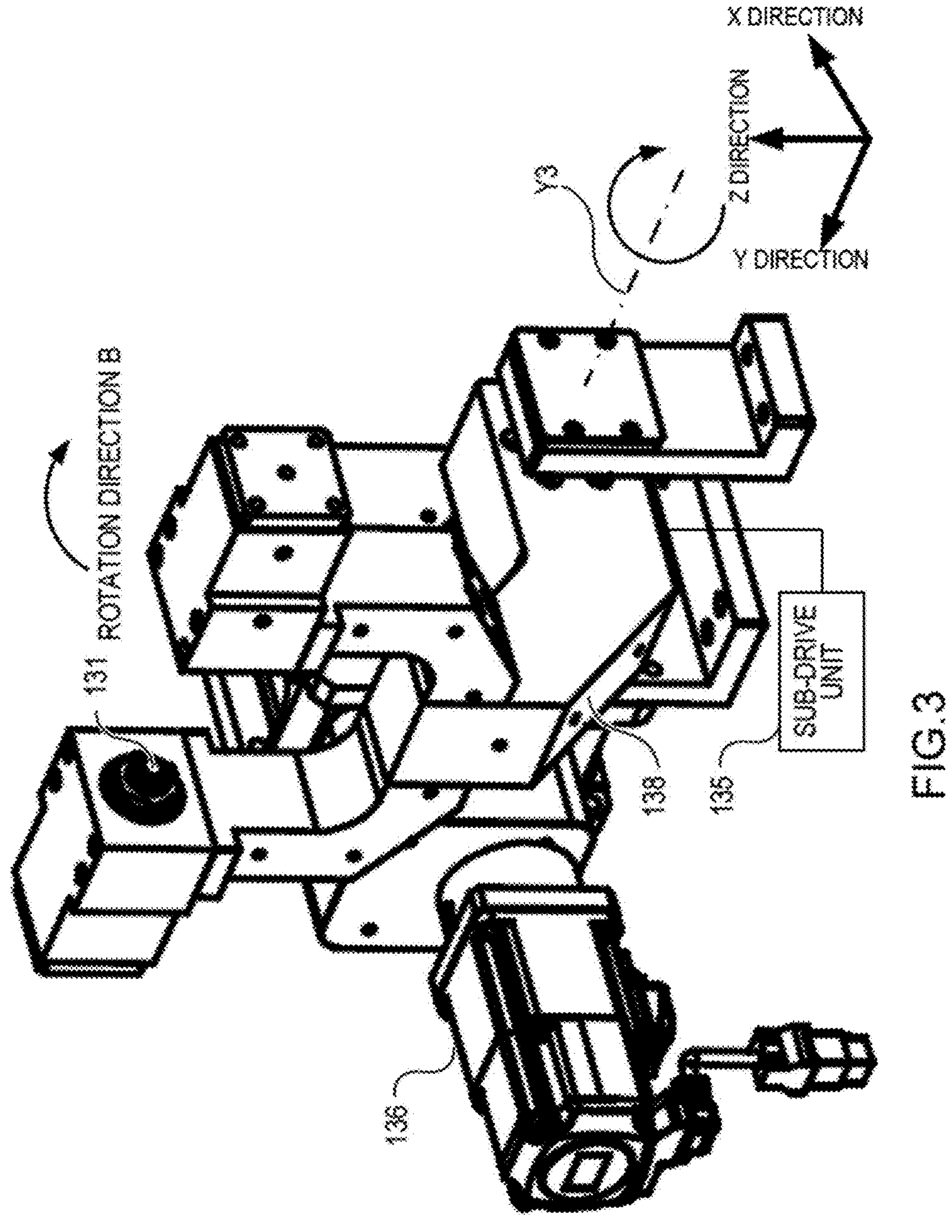
FIG. 3 is a schematic perspective view of a sub-support mechanism at a standby position.

As illustrated in FIG. 1, the jig device 100 includes the sub-support mechanism 130 disposed on a side opposite to the holding mechanism 110 with respect to the main support mechanism 120. Then, as illustrated in FIG. 3, the sub-support mechanism 130 includes a sub-support member 131 as an example of the second-axial-direction support member. Then, when the first axial direction orthogonal to the spindle direction and the second axial direction orthogonal to the spindle direction and the first axial direction are defined, the sub-support member 131 faces the workpiece W in the second axial direction. Incidentally, FIG. 3 illustrates the sub-support mechanism 130 at a standby position observed from an observation direction A in FIG. 1.

Here, the first axial direction is a direction from one end (holding end) toward the free end of the workpiece W held by the holding mechanism 110. For example, in the example of FIG. 3, the sub-support member 131 faces the workpiece W (not illustrated) in the Y direction orthogonal to the Z direction as the spindle direction. That is, the holding mechanism 110 holds one end of the workpiece W in the X direction in the example of FIG. 3.

Incidentally, when the direction extending from the holding end toward the free end of the workpiece W held by the holding mechanism 110 is the X direction, the second axial direction is the Y direction. Then, the sub-support member 131 supports the workpiece W in the Y direction. On the other hand, when the direction extending from the holding end toward the free end of the workpiece W held by the holding mechanism 110 is the Y direction, the second axial direction is the X direction. Then, the sub-support member 131 supports the workpiece W in the X direction. That is, the sub-support mechanism 130 supports the workpiece W by supporting a load applied to the sub-support mechanism 130 through the held workpiece W.

In addition, the sub-support mechanism 130 includes a sub-drive unit 135 as an example of a second-axial-direction drive unit that drives the sub-support member 131. The sub-drive unit 135 drives the sub-support member 131 between a second-axial-direction support position where the sub-support member 131 is in contact with the workpiece W and a second-axial-direction retracted position where the sub-support member 131 is separated from the workpiece W in the second axial direction. Specifically, the sub-drive unit 135 causes the sub-support member 131 at the second-axial-direction retracted position illustrated in FIG. 3 to protrude toward the second-axial-direction support position in the Y direction as the second axial direction. Further, the sub-drive unit 135 retracts the sub-support member 131 protruding to the second-axial-direction support position toward the second-axial-direction retracted position in the Y direction.

Figure 4:
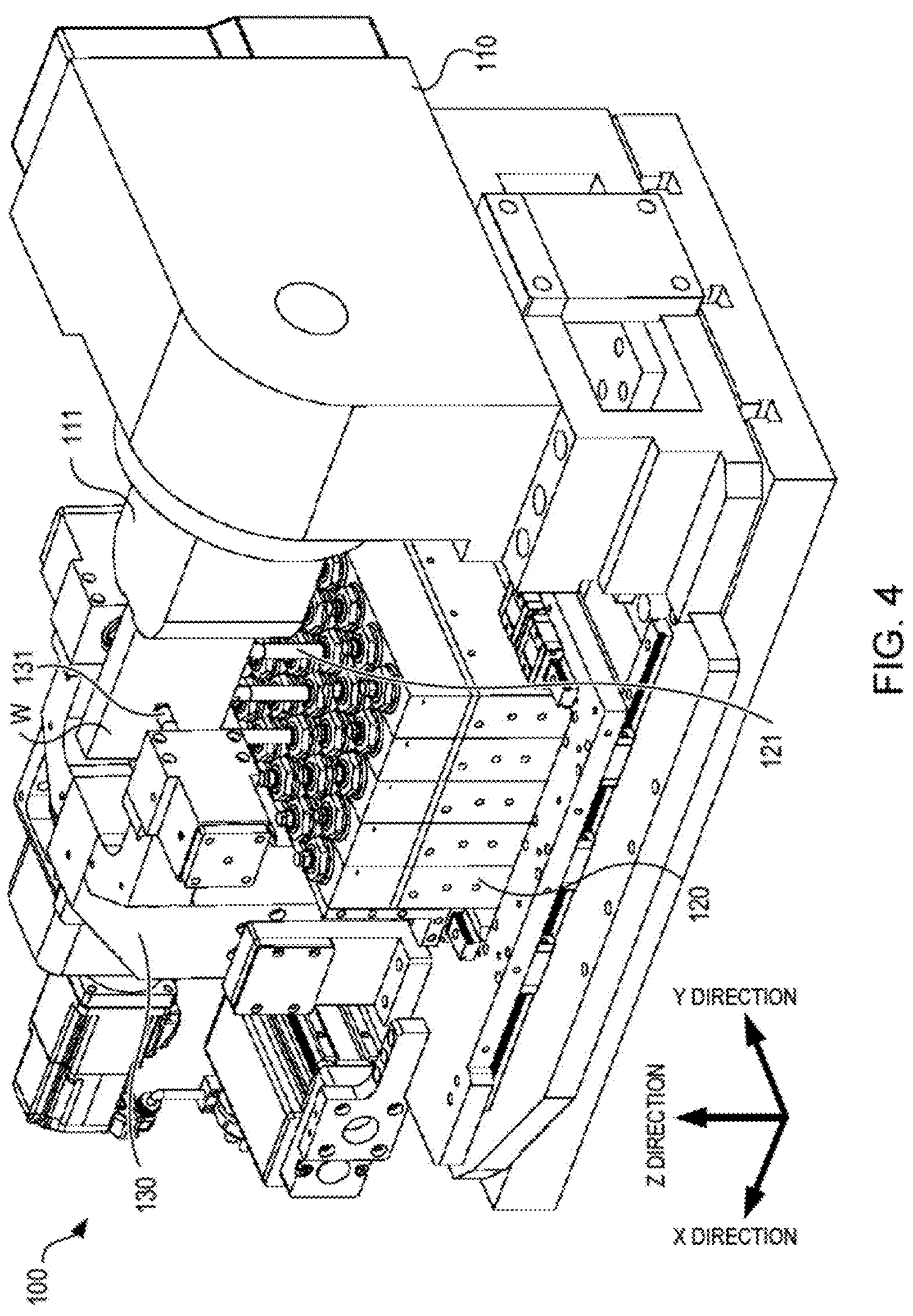
FIG. 4 is a schematic perspective view of the jig device.

Specifically, the driving of the sub-support member 131 will be described with reference to FIGS. 3 and 4. Incidentally, FIG. 3 is a schematic perspective view of the sub-support member 131 at the second-axial-direction retracted position. In addition, FIG. 4 is a schematic perspective view of the jig device 100 in which the sub-support member 131 is at the second-axial-direction support position. FIGS. 3 and 4 illustrate one of a pair of sub-support members 131 disposed so as to sandwich the workpiece W. A distal end of the sub-support member 131 is flat, and a distal end face thereof comes into contact with the workpiece W. Alternatively, the distal end of the sub-support member 131 may have another shape such as a sphere or a hemisphere.

Each of the sub-support members 131 is a substantially columnar member that is displaced from the second-axial-direction retracted position toward the second-axial-direction support position. Then, the sub-support member 131 is driven by the action of power supplied from the sub-drive unit 135. For example, the sub-support member 131 is driven by electric power, air pressure, hydraulic pressure, a spring force by a compression spring, or the like. As an example, the sub-support member 131 is a pin or a rod of a linear actuator such as a solenoid actuator, a feed screw, an air cylinder, or a hydraulic cylinder.

Then, the sub-support member 131 stops protruding when coming into contact with the workpiece W. Thereafter, the protrusion and retraction of the sub-support member 131 is restricted. Thus, a load applied in the Y direction to the workpiece W held in the cantilevered state by the chuck 111 is supported by the sub-support member 131. Thereafter, when machining ends, the sub-support member 131 is retracted. Then, the retracted sub-support member 131 stops at the second-axial-direction retracted position.

The sub-support mechanism 130 is configured to be capable of changing a position of the sub-support member 131 on a parallel plane parallel to the spindle direction and the first axial direction. Specifically, the sub-support mechanism 130 includes a parallel rotation mechanism 136 that rotates the sub-support member 131 about a parallel rotation axis line Y3 parallel to the second axial direction such that the position of the sub-support member 131 can be changed on the parallel plane. In the example of FIG. 3, the parallel rotation mechanism 136 of the sub-support mechanism 130 rotates the sub-support member 131 on a ZX plane that is the parallel plane parallel to the Z direction as the spindle direction and the X direction as the first axial direction.

That is, the parallel rotation axis line Y3 indicated by a one-dot chain line in FIG. 3 is parallel to the Y direction as the second axial direction. Then, the parallel rotation mechanism 136 rotates the sub-support member 131 about the parallel rotation axis line Y3. Therefore, the parallel rotation mechanism 136 includes a drive device that outputs a rotary motion, a transmission mechanism such as a gear that transmits the rotation output from the drive device, and a rotary shaft. The rotary shaft is inserted into a shaft hole (not illustrated) of a sub-support arm 138. Then, the sub-support arm 138 provided with the sub-support member 131 rotates together with the rotary shaft inserted into the shaft hole.

As a result, the sub-support member 131 is rotated on the ZX plane along a rotation direction B in FIG. 3. Then, a position of the sub-support member 131 and a contact position between the sub-support member 131 and the workpiece W change along a rotation trajectory of the sub-support member 131. Incidentally, the parallel rotation mechanism 136 can adjust the position of the sub-support member 131 on the ZX plane by adjusting a rotation angle.

In addition, the jig device 100 includes the first movement mechanism that moves the sub-support mechanism 130. Then, the first movement mechanism moves the sub-support mechanism 130 on the table 210. Specifically, the first movement mechanism moves the sub-support mechanism 130 together with the main support mechanism 120 in the X direction as the second axial direction orthogonal to the Z direction. That is, the sub-support mechanism 130 is fixed to the stage 220 common to the main support mechanism 120.

Further, the jig device 100 further includes the second movement mechanism (not illustrated) that moves the sub-support mechanism 130 in the Y direction orthogonal to the Z direction. Then, the second movement mechanism moves the sub-support mechanism 130 together with the main support mechanism 120 in the Y direction. Alternatively, the sub-support mechanism 130 may be configured to move in at least one of the X direction and the Y direction separately from the main support mechanism 120. That is, the jig device 100 may include an independent movement mechanism that moves only the sub-support mechanism 130 in at least one of the X direction and the Y direction.

For example, the sub-drive unit 135 and the parallel rotation mechanism 136 are controlled by the control device of the machine tool. Then, the parallel rotation mechanism 136 rotates the sub-support member 131 to a position corresponding to the shape of the workpiece W recognized by the control device. As an example, the parallel rotation mechanism 136 rotates the sub-support member 131 at the standby position illustrated in FIG. 3 by 90 degrees to rotationally move the sub-support member 131 to an operation position illustrated in FIG. 4. Thereafter, the sub-drive unit 135 causes the sub-support member 131 to protrude under the control of the control device.

The sub-support mechanism 130 includes at least two sub-support members 131 so as to sandwich the workpiece W from both sides in the second axial direction. Specifically, as illustrated in FIG. 3, a distal end of the sub-support arm 138 is bifurcated. Then, the sub-support members 131 are disposed at the two distal ends, respectively. Thus, the workpiece W can be supported from the both sides in the second axial direction (for example, the Y direction). Incidentally, the number of the sub-support members 131 is not limited to two, and three or more sub-support members 131 may be disposed so as to sandwich the workpiece W from the both sides in the second axial direction.

When the workpiece W in the cantilevered state is machined, a load may be applied to the workpiece W in the second axial direction (for example, the X direction or the Y direction) orthogonal to the spindle direction (for example, the Z direction), the second axial direction being orthogonal to the direction extending from the holding end toward the free end of the workpiece W. For example, when machining is performed on the plate-shaped workpiece W in a state where an end face having a narrower width faces upward, side faces having a wider width are parallel in the second axial direction. At the time, the second axial direction is a direction corresponding to a thin wall thickness, and thus the workpiece W is distorted if the load is applied in the second axial direction. For example, when the end face is cut using an end mill, a load is applied in a tangential direction of the end mill, and as a result, the load is applied to the workpiece W in the second axial direction. In such a respect, according to the jig device 100 including the sub-support mechanism 130, the distortion of the workpiece W can be suppressed by supporting the workpiece W even if the load is applied in the second axial direction.

Alternatively, the sub-support member 131 may be disposed to support the workpiece W from one side in the second axial direction. That is, the sub-support member 131 may be disposed only at a position facing one side of the workpiece W. Even in the case, the workpiece W can be supported from one side. That is, there is a case where a load is mainly applied from one side to the other side of the workpiece W in the second axial direction when the workpiece W in the cantilevered state is machined. In the case, the sub-support member 131 may be disposed only at a position facing the other side of the workpiece W.

With the jig device 100 according to the present embodiment described above, the machining efficiency of the workpiece W can be improved in response to various machining conditions applied to the workpiece W. For example, when a machined face is changed, the workpiece W can be switched inside the machine tool without stopping the machine tool. Thus, the stop time of the machine tool can be reduced, and the machining efficiency of the workpiece W can be improved. In addition, the jig device 100 according to the present embodiment can be installed in a plurality of types of machine tools. For example, the jig device 100 can be attached to and detached from a machine tool such as a five-axis machine tool or a three-axis machine tool. Incidentally, as an example, the drive device for the main support member 121 or the sub-support member 131 described above is a pressure motor, an electric motor, an ultrasonic motor, or the like.

Hitherto, the present invention has been described with reference to each embodiment, but the present invention is not limited to the above embodiment. Inventions modified within a range without contradictory to the present invention and inventions equivalent to the present invention are also included in the present invention. In addition, each embodiment and each modification and technical means included in the embodiment or the modification can be appropriately combined within a range not contradictory to the present invention.

For example, the workpiece W may be machined in the state of being supported by the main support mechanism 120, and then the chuck 111 may be rotated by 90 degrees. Thus, for example, after an upper face of the workpiece W on the spindle 200 side is machined, a side face of the workpiece W (that is, the face orthogonal to the upper face and a lower face) can be machined in the state of being supported by the main support mechanism 120 and the sub-support mechanism 130. Therefore, the workpiece W can be machined into a complicated shape without stopping the machine tool.

Specifically, as illustrated in FIG. 4 which is the schematic perspective view of the jig device 100, the side face of the workpiece W can be machined in the state of being supported by the main support mechanism 120 and the sub-support mechanism 130. That is, first, the upper face of the workpiece W is machined in a state where the workpiece W is supported by the main support mechanism 120 as illustrated in FIG. 2. Thereafter, the chuck 111 of the holding mechanism 110 is rotated by 90 degrees about the rotation axis parallel to the X direction. Thus, the side face of the workpiece W located on the far side or the near side in FIG. 2 faces the spindle 200. Therefore, the side face of the workpiece W can be machined without stopping the machine tool.

As another example, the jig device 100 may be disposed in a suspended state on the upper side in the direction of gravity, and the spindle 200 of the machine tool may be disposed on the lower side in the direction of gravity. In the case, powdery materials generated by machining, for example, chips fall toward the spindle 200. Therefore, the powdery materials can be suppressed from accumulating at the machining position. In addition, the jig device 100 may be attached in a posture rotated by 90 degrees with respect to the table 210. In the case, the spindle direction is orthogonal to the direction of gravity. Thus, the jig device 100 can be attached to a five-axis machine tool, a horizontal machine tool, or the like to machine the workpiece W.

In addition, the main support mechanism 120 may be configured to rotate about a rotation axis parallel to the X direction or the Y direction integrally with the sub-support mechanism 130. That is, the main support mechanism 120 may include a rotating device that rotates the main support mechanism 120 and the sub-support mechanism 130 about the rotation axis. For example, the rotating device rotates the stage 220 on which the main support mechanism 120 and the sub-support mechanism 130 are placed about the rotation axis parallel to the X direction or the Y direction. As an example, the rotating device rotates the stage 220 by 90 degrees about the rotation axis parallel to the X direction. In the case, the spindle direction is orthogonal to the direction of gravity. Thus, the jig device 100 can be attached to a five-axis machine tool, a horizontal machine tool, or the like to machine the workpiece W.

Further, the main support mechanism 120 may be configured to rotate about a rotation axis parallel to the X direction or the Y direction separately from the sub-support mechanism 130. That is, the main support mechanism 120 may include a rotating device that rotates only the main support mechanism 120 about the rotation axis without rotating the sub-support mechanism 130. Similarly, the sub-support mechanism 130 may be configured to rotate about a rotation axis parallel to the X direction or the Y direction separately from the main support mechanism 120. That is, the sub-support mechanism 130 may include a rotating device that rotates only the sub-support mechanism 120 about the rotation axis without rotating the main support mechanism 130.

In addition, one of the main support mechanism 120 and the sub-support mechanism 130 may be omitted. For example, the jig device 100 may include only the main support mechanism 120. Further, the jig device 100 may include only the sub-support mechanism 130. As an example, in the jig device 100 including only the sub-support mechanism 130, machining can be performed on the workpiece W fixed on the stage 220. Even in the case, the workpiece W can be supported from the Y direction or the Z direction orthogonal to the spindle direction.

[Modification]

Figure 5:
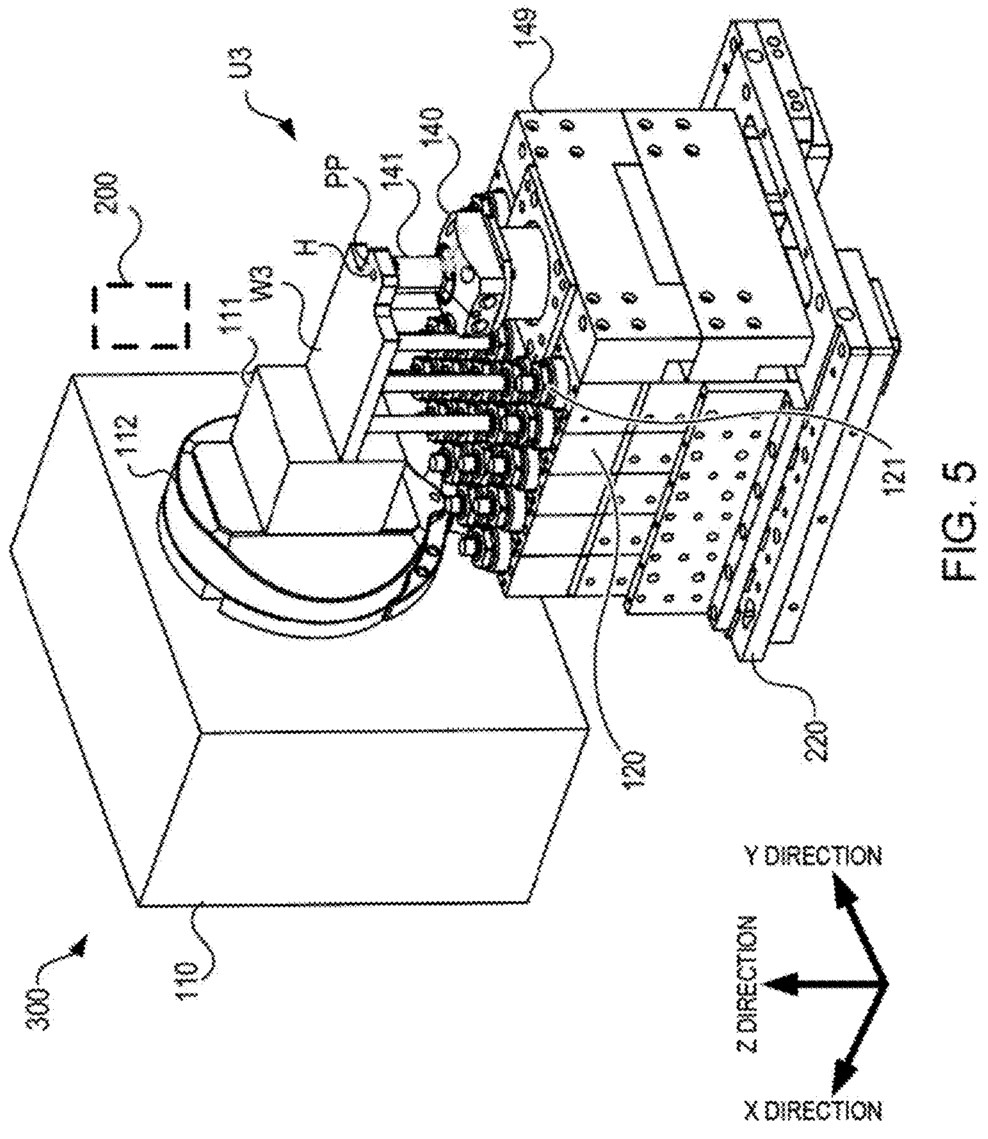
FIG. 5 is a schematic perspective view of a jig device according to a modification.
Figures 6A, 6B:
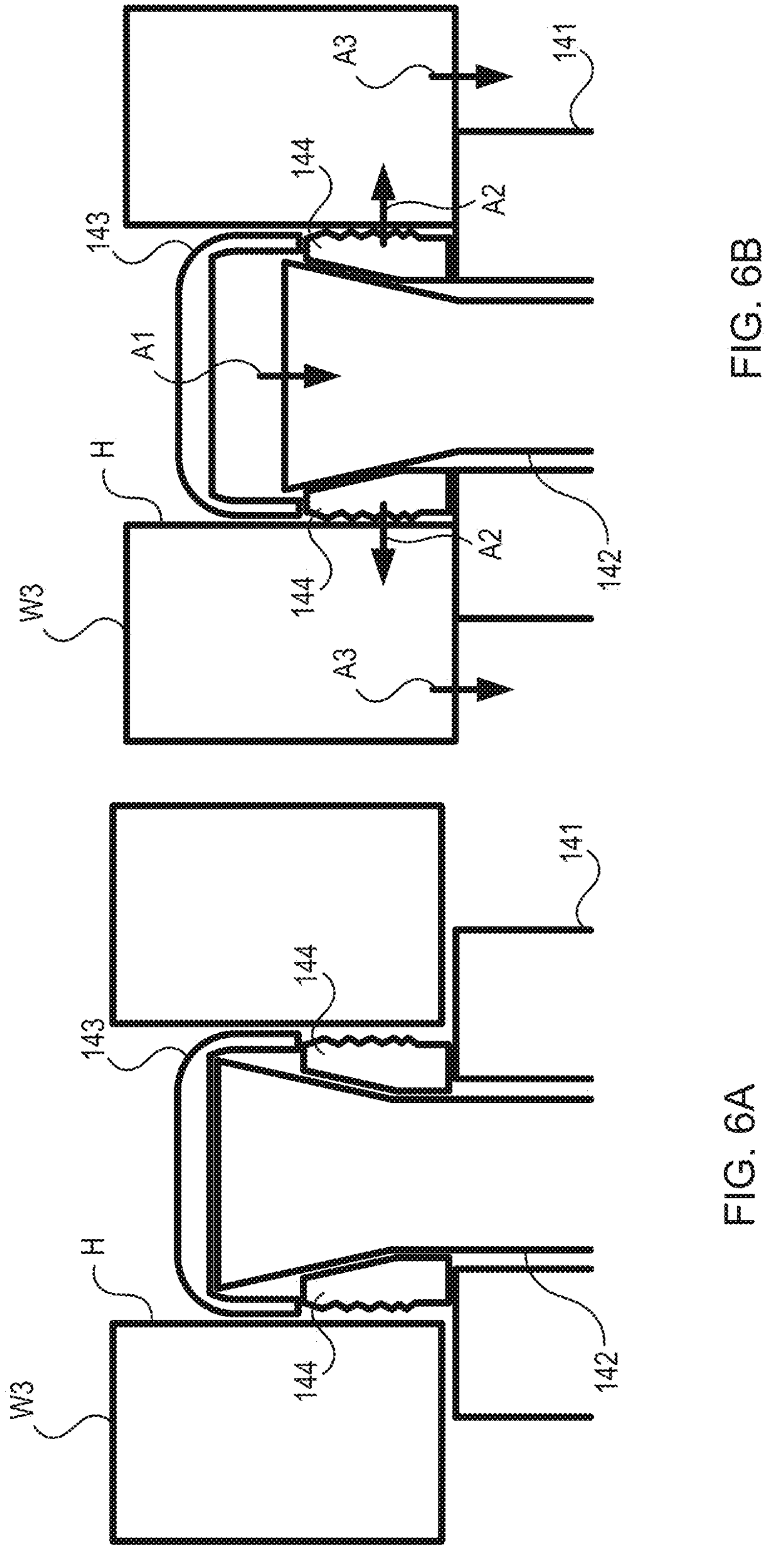
FIG. 6A is a schematic explanatory view illustrating a state before drawing.
FIG. 6B is a schematic explanatory view illustrating a state after the drawing.

A jig device 300 according to a modification will be described with reference to FIGS. 5, 6A and 6B. FIG. 5 is a schematic perspective view of the jig device 300 as viewed obliquely from above. In addition, FIG. 6 illustrates schematic explanatory views for describing a hole clamping device 140. Incidentally, in the description of the modification, differences from the embodiment described above will be mainly described. The already described components are denoted by the same reference signs, and description thereof will be omitted. Unless otherwise described, the components denoted by the same reference signs exhibit substantially the same operation and function, and functions and effects thereof are also substantially the same.

Incidentally, FIG. 5 does not illustrate the sub-support mechanism 130 (FIG. 1) as an example of a second-axial-direction support mechanism for convenience of description. However, the jig device 300 includes the sub-support mechanism 130 (not illustrated). As an example, the sub-support mechanism 130 is disposed at a position to sandwich the hole clamping device 140 with the main support mechanism 120 as an example of a spindle-direction support mechanism. In other words, the sub-support mechanism 130 is disposed on a side opposite to the main support mechanism 120 with respect to the hole clamping device 140.

As illustrated in FIG. 5, the jig device 300 includes the holding mechanism 110 that holds a workpiece W3 in a cantilevered state, and a jig unit U3. Then, the jig unit U3 includes the hole clamping device 140 as an example of a restraint mechanism that restrains a part of the workpiece W3 so as to restrict displacement of the workpiece W3 in a direction (hereinafter, also referred to as a Z direction) parallel to a spindle direction of a machine tool. Further, the jig unit U3 further includes the main support mechanism 120 and the sub-support mechanism 130 (not illustrated). Alternatively, the jig unit U3 does not necessarily include at least one of the main support mechanism 120 and the sub-support mechanism 130.

In addition, the hole clamping device 140 is disposed at a position to sandwich the main support mechanism 120 with the holding mechanism 110. In other words, the hole clamping device 140 is disposed on a side opposite to the holding mechanism 110 with respect to the main support mechanism 120. Then, the hole clamping device 140 restrains a protruding portion PP protruding from the main body of the workpiece W3 as the part of the workpiece W3. The protruding portion PP is an excess portion that sticks out from the main body to be machined in the workpiece W3 and is not to be machined.

In the example of FIG. 5, the protruding portion PP is a free end of the workpiece W3. That is, when the holding mechanism 110 holds a holding end of the workpiece W3 in an X direction, the other end of the workpiece W3 in the X direction is the protruding portion PP. However, the protruding portion PP is not necessarily the free end, and may be, for example, a side edge portion extending in the X direction in the workpiece W3. Incidentally, the protruding portion PP may have any outer shape, and as an example, may have a polygonal shape, a circular shape, an elliptical shape, or other shapes. Further, the part of the workpiece W3 restrained by the hole clamping device 140 may be an excess portion (for example, a side edge portion) continuous from the main body of the workpiece W3.

With such hole clamping device 140, it is possible to suppress displacement of the workpiece W3 in the Z direction, that is, positional deviation or chattering of the workpiece W3 in the spindle direction during machining. Therefore, it is possible to prevent the workpiece W3 from being separated from the main support mechanism 120, that is, the workpiece W3 from being displaced toward the spindle 200 during machining. For example, the holding mechanism 110 may hold the workpiece W3 such that the X direction or a Y direction is parallel to the direction of gravity. Specifically, the hole clamping device 140 may be located below or above the main support mechanism 120 with the spindle direction being orthogonal to the direction of gravity.

A force from a machining device is applied to the workpiece W3 in the above state in the Z direction horizontal to the direction of gravity. Then, gravity is not applied in the Z direction from the workpiece W3 toward the main support mechanism 120. Therefore, gravity that pushes the workpiece W3 toward the main support mechanism 120 is not applied, and displacement in a direction away from the main support mechanism 120 cannot be suppressed. Even in the case, however, the hole clamping device 140 can restrain the protruding portion PP and suppress the separation of the workpiece W3 from the main support mechanism 120.

Alternatively, the jig unit U3 may include another restraint mechanism instead of or in addition to the hole clamping device 140. As an example, the other restraint mechanism is a suction device that sucks and restrains a part of the workpiece W3, a hook that hooks a part of the workpiece W3, a holding device that grips a part of the workpiece W3, or the like. In the case, a portion restrained by the other restraint mechanism may be a part of a portion to be machined of the workpiece W3, an excess portion of the workpiece W3, or the like. In addition, the other restraint mechanism may be a mechanism that restrains the workpiece W3 from the spindle 200 side. However, when the workpiece W3 is restrained from a side opposite to the spindle 200, it is possible to avoid hindering the sub-support mechanism 130 from supporting the workpiece W3.

Further, the jig unit U3 further includes a moving device 149 that moves the hole clamping device 140 forward and backward in the Z direction. The moving device 149 moves the hole clamping device 140 so as to approach the workpiece W3 when the hole clamping device 140 restrains the workpiece W3. In addition, the moving device 149 moves the hole clamping device 140 so as to be separated from the workpiece W3 after releasing the restraint by the hole clamping device 140. Alternatively, the moving device 149 may move a workpiece support portion 141 of the hole clamping device 140 forward and backward in the Z direction.

[Restraint Mechanism]

The hole clamping device 140 will be described with reference to FIGS. 6A and 6B. Incidentally, each of FIGS. 6A and 6B is a schematic view of a cross section extending in a thickness direction of the workpiece W3, the cross section passing through a center axis (not illustrated) of a hole H. Then, FIG. 6A illustrates a state before the workpiece W3 is drawn toward the hole clamping device 140. In addition, FIG. 6B illustrates a state after the workpiece W3 is drawn toward the hole clamping device 140.

The hole clamping device 140 operates to tense inside the hole H formed in the protruding portion PP and draw the workpiece W3 toward the hole clamping device 140. Therefore, as illustrated in FIGS. 6A and 6B, the hole clamping device 140 includes the workpiece support portion 141 and a rod 142 that operates forward and backward with respect to the workpiece support portion 141. Incidentally, in the example of FIGS. 6A and 6B, the hole H is a through-hole, but the hole H may be a closed hole (that is, a blind hole). Further, the workpiece W3 may have a hole formed in a portion to be machined, instead of the protruding portion PP, as a portion to be restrained by the hole clamping device 140.

As illustrated in FIG. 6A, the hole clamping device 140 includes a cap 143 that covers a wedge-shaped distal end of the rod 142. As an example, the distal end of the rod 142 has a shape like a truncated cone. Then, the cap 143 and the rod 142 are inserted into the hole H formed in the protruding portion PP. Further, the hole clamping device 140 includes a tension member 144 that operates forward and backward with respect to the cap 143. Then, a plurality of (as an example, four) tension members 144 are disposed around the rod 142.

In the state before the drawing illustrated in FIG. 6A, the tension members 144 are retracted to the inside of the cap 143. Thereafter, the rod 142 moves in a direction indicated by an arrow A1 in FIG. 6B (that is, downward in FIG. 6B). Then, the tension members 144 protrude outward (that is, the left-and-right direction in FIG. 6B) indicated by an arrow A2 from the cap 143 along a tapered face at the distal end of the rod 142. Then, the tension members 144 abut on and bite into an inner surface of the hole H. Then, the hole clamping device 140 draws the workpiece W3 in a direction (that is, downward in FIG. 6B) indicated by an arrow A3 by air pressure or the like. Thus, the workpiece W3 is pressed against a support face of the workpiece support portion 141, and the workpiece W3 is restrained by the hole clamping device 140.

Further, the hole clamping device 140 supplies air pressure to move the rod 142 in a direction (that is, upward in FIG. 6B) opposite to the direction indicated by the arrow A1 for releasing the restraint of the workpiece W3. Thus, biasing of the tension members 144 by the distal end of the rod 142 is released. Then, the tension members 144 are biased by an elastic member (for example, a spring, an elastic ring, or the like), not illustrated, to move to original positions inside the cap 143. That is, the tension members 144 are retracted in a direction opposite to the direction indicated by the arrow A2. Thus, the restraint of the workpiece W3 by the hole clamping device 140 is released.

As described above, the jig device 300 and the jig unit U3 include the restraint mechanism that restrains a part of the workpiece W3. Thus, it is possible to suppress the workpiece W3 from being bent and displaced in the z direction during machining of the workpiece W3. Therefore, the separation of the workpiece W3 from the main support mechanism 120 can be prevented during machining of the workpiece W3.

Incidentally, it is sufficient for the restraint mechanism such as the hole clamping device 140 to restrict the movement of the workpiece W3 in a direction of being separated from the main support mechanism 120. Therefore, the restraint mechanism does not necessarily draw the workpiece W3 toward the restraint mechanism or toward the main support mechanism 120. For example, the restraint mechanism may restrain the workpiece W3 simply by gripping and holding a part of the workpiece W3. Further, the hole clamping device 140 may only restrict the movement in the direction away from the hole clamping device 140 without drawing the workpiece W3.

Some or all of the above embodiments can also be described as the following in Supplements, but are not limited to the following.

Supplement 1

A jig device of a workpiece in a machine tool, the jig device comprising:

a holding mechanism that holds the workpiece in a cantilevered state; and a spindle-direction support mechanism including at least one spindle-direction support member disposed to face the workpiece from a side opposite to a spindle of the machine tool in a spindle direction with respect to the workpiece held in the cantilevered state by the holding mechanism, the spindle-direction support mechanism including a spindle-direction drive unit that drives the spindle-direction support member in the spindle direction between a spindle-direction support position in contact with the workpiece and a spindle-direction retracted position separated from the workpiece, wherein the spindle-direction support mechanism is configured to be capable of changing a contact position where the spindle-direction support member is in contact with the workpiece on an orthogonal plane orthogonal to the spindle direction.

Supplement 2

The jig device according to Supplement 1, wherein the spindle-direction support mechanism includes a plurality of the spindle-direction support members disposed at different positions on the orthogonal plane, the plurality of spindle-direction support members are divided in such a manner that at least one of the spindle-direction support members is included for each of driving units by the spindle-direction drive unit, and the spindle-direction drive unit drives each spindle-direction support member for each of the driving units.

Supplement 3

The jig device according to Supplement 1 or 2, wherein the holding mechanism includes a rotation mechanism that rotates the workpiece about one rotation axis line orthogonal to the spindle direction.

Supplement 4

The jig device according to Supplement 1 or 2, wherein the holding mechanism includes a first rotation mechanism that rotates the workpiece about a first rotation axis line orthogonal to the spindle direction, and a second rotation mechanism that rotates the workpiece about a second rotation axis line orthogonal to the spindle direction and the first rotation axis line.

Supplement 5

The jig device according to any one of Supplements 1 to 4, further comprising a second-axial-direction support mechanism including a second-axial-direction support member that faces the workpiece in a second axial direction when a first axial direction orthogonal to the spindle direction and the second axial direction orthogonal to the spindle direction and the first axial direction are defined, wherein the holding mechanism holds one end of the workpiece in the first axial direction, and the second-axial-direction support mechanism includes a second-axial-direction drive unit that drives the second-axial-direction support member in the second axial direction between a second-axial-direction support position in contact with the workpiece and a second-axial-direction retracted position separated from the workpiece.

Supplement 6

The jig device according to Supplement 5, wherein the second-axial-direction support mechanism is configured to be capable of changing a position of the second-axial-direction support member on a parallel plane parallel to the spindle direction and the first axial direction.

Supplement 7

The jig device according to Supplement 5 or 6, wherein the second-axial-direction support mechanism includes at least two second-axial-direction support members to sandwich the workpiece from both sides in the second axial direction.

Supplement 8

The jig device according to any one of Supplements 1 to 7, further comprising a restraint mechanism that restrains a part of the workpiece to restrict displacement of the workpiece in the spindle direction, wherein the restraint mechanism is disposed at a position to sandwich the spindle-direction support mechanism with the holding mechanism.

Supplement 9

A jig unit for a jig device of a workpiece held in a cantilevered state in a machine tool, the jig unit comprising:

a spindle-direction support mechanism including at least one spindle-direction support member disposed to face the workpiece from a side opposite to a spindle of the machine tool in a spindle direction with respect to the workpiece held in the cantilevered state, the spindle-direction support mechanism including a spindle-direction drive unit that drives the spindle-direction support member in the spindle direction between a spindle-direction support position in contact with the workpiece and a spindle-direction retracted position separated from the workpiece, wherein the spindle-direction support mechanism is configured to be capable of changing a contact position where the spindle-direction support member is in contact with the workpiece on an orthogonal plane orthogonal to the spindle direction.

Supplement 10

A jig device of a workpiece in a machine tool, the jig device comprising:

a holding mechanism that holds the workpiece in a cantilevered state; and a second-axial-direction support mechanism including a second-axial-direction support member that faces the workpiece in a second axial direction when a first axial direction orthogonal to the spindle direction and the second axial direction orthogonal to the spindle direction and the first axial direction are defined, wherein the holding mechanism holds one end of the workpiece in the first axial direction, and the second-axial-direction support mechanism includes a second-axial-direction drive unit that drives the second-axial-direction support member in the second axial direction between a second-axial-direction support position in contact with the workpiece and a second-axial-direction retracted position separated from the workpiece.

Supplement 11

The jig device according to Supplement 10, wherein the second-axial-direction support mechanism is configured to be capable of changing a position of the second-axial-direction support member on a parallel plane parallel to the spindle direction and the first axial direction.

Supplement 12

The jig device according to Supplement 11, wherein the second-axial-direction support mechanism includes a parallel rotation mechanism that rotates the second-axial-direction support member about a parallel rotation axis line parallel to the second axial direction in such a manner as to be capable of changing the position of the second-axial-direction support member on the parallel plane.

Supplement 13

The jig device according to Supplement 10 or 11, wherein the second-axial-direction support mechanism includes at least two second-axial-direction support members to sandwich the workpiece from both sides in the second axial direction.

Supplement 14

The jig device according to any one of Supplements 10 to 13, wherein the holding mechanism includes a rotation mechanism that rotates the workpiece about one rotation axis line orthogonal to the spindle direction.

Supplement 15

The jig device according to any one of Supplements 10 to 13, wherein the holding mechanism includes a first rotation mechanism that rotates the workpiece about a first rotation axis line orthogonal to the spindle direction, and a second rotation mechanism that rotates the workpiece about a second rotation axis line orthogonal to the spindle direction and the first rotation axis line.

Supplement 16

A jig unit for a jig device of a workpiece held in a cantilevered state in a machine tool, the jig unit comprising:

a second-axial-direction support mechanism including a second-axial-direction support member that faces the workpiece in a second axial direction when a first axial direction orthogonal to the spindle direction and the second axial direction orthogonal to the spindle direction and the first axial direction are defined, wherein the second-axial-direction support mechanism includes a second-axial-direction drive unit that drives the second-axial-direction support member in the second axial direction between a second-axial-direction support position in contact with the workpiece and a second-axial-direction retracted position separated from the workpiece.

What is claimed is:

1. A jig device of a workpiece in a machine tool, the jig device comprising:

a holding mechanism that holds the workpiece in a cantilevered state;

a spindle-direction support mechanism including a plurality of spindle-direction support members disposed to face the workpiece from a side opposite to a spindle of the machine tool in a spindle direction with respect to the workpiece held in the cantilevered state by the holding mechanism, the spindle-direction support mechanism including a spindle-direction drive unit that drives the spindle-direction support member in the spindle direction between a spindle-direction support position in contact with the workpiece and a spindle-direction retracted position separated from the workpiece; and a second-axial-direction support mechanism including a second-axial-direction support member that faces the workpiece in a second axial direction when a first axial direction orthogonal to the spindle direction and the second axial direction orthogonal to the spindle direction and the first axial direction are defined, wherein the spindle-direction drive unit drives some of the plurality of spindle-direction support members at positions corresponding to a shape of the workpiece, among the plurality of spindle-direction support members at the spindle-direction retracted positions to the spindle-direction support positions according to control by a control device of the machine tool, the holding mechanism holds one end of the workpiece in the first axial direction, the second-axial-direction support mechanism includes a second-axial-direction drive unit that drives the second-axial-direction support member in the second axial direction between a second-axial-direction support position in contact with the workpiece and a second-axial-direction retracted position separated from the workpiece, and the second-axial-direction support mechanism is configured to be capable of changing a position of the second-axial-direction support member on a parallel plane parallel to the spindle direction and the first axial direction.

2. The jig device according to claim 1, wherein the plurality of spindle-direction support members are disposed at different positions on an orthogonal plane orthogonal to the spindle direction, the plurality of spindle-direction support members are divided in such a manner that at least one of the spindle-direction support members is included for each of driving units by the spindle-direction drive unit, and the spindle-direction drive unit drives each spindle-direction support member for each of the driving units.

3. The jig device according to claim 1, wherein the second-axial-direction support mechanism moves the second-axial-direction support member at the second-axial-direction retracted position to an operation position on the parallel plane according to control by the control device, and the second-axial-direction drive unit drives the second-axial-direction support member at the operation position to the second-axial-direction support position according to control by the control device.

4. A jig device of a workpiece in a machine tool, the jig device comprising:

a holding mechanism that holds the workpiece in a cantilevered state; and a spindle-direction support mechanism including at least one spindle-direction support member disposed to face the workpiece from a side opposite to a spindle of the machine tool in a spindle direction with respect to the workpiece held in the cantilevered state by the holding mechanism, the spindle-direction support mechanism including a spindle-direction drive unit that drives the spindle-direction support member in the spindle direction between a spindle-direction support position in contact with the workpiece and a spindle-direction retracted position separated from the workpiece;

wherein the holding mechanism includes a first rotation mechanism that rotates the workpiece about a first rotation axis line orthogonal to the spindle direction, and a second rotation mechanism that rotates the workpiece about a second rotation axis line orthogonal to the spindle direction and the first rotation axis line.

5. A jig device of a workpiece in a machine tool, the jig device comprising:

a holding mechanism that holds the workpiece in a cantilevered state;

a spindle-direction support mechanism including at least one spindle-direction support member disposed to face the workpiece from a side opposite to a spindle of the machine tool in a spindle direction with respect to the workpiece held in the cantilevered state by the holding mechanism, the spindle-direction support mechanism including a spindle-direction drive unit that drives the spindle-direction support member in the spindle direction between a spindle-direction support position in contact with the workpiece and a spindle-direction retracted position separated from the workpiece; and a restraint mechanism that restrains a part of the workpiece to restrict displacement of the workpiece in the spindle direction when the workpiece is machined in a state where the holding mechanism holds the workpiece, wherein the restraint mechanism is disposed at a position to sandwich the spindle-direction support mechanism with the holding mechanism.

6. A jig unit for a jig device of a workpiece held in a cantilevered state in a machine tool, the jig unit comprising:

a spindle-direction support mechanism including a plurality of spindle-direction support members disposed to face the workpiece from a side opposite to a spindle of the machine tool in a spindle direction with respect to the workpiece held in the cantilevered state, the spindle-direction support mechanism including a spindle-direction drive unit that drives the spindle-direction support member in the spindle direction between a spindle-direction support position in contact with the workpiece and a spindle-direction retracted position separated from the workpiece; and a second-axial-direction support mechanism including a second-axial-direction support member that faces the workpiece in a second axial direction when a first axial direction orthogonal to the spindle direction and the second axial direction orthogonal to the spindle direction and the first axial direction are defined, wherein the spindle-direction drive unit drives some of the plurality of the spindle-direction support members at positions corresponding to a shape of the workpiece, among the plurality of spindle-direction support members at the spindle-direction retracted positions to the spindle-direction support positions according to control by a control device of the machine tool, one end of the workpiece in the first axial direction is held, the second-axial-direction support mechanism includes a second-axial-direction drive unit that drives the second-axial-direction support member in the second axial direction between a second-axial-direction support position in contact with the workpiece and a second-axial-direction retracted position separated from the workpiece, and the second-axial-direction support mechanism is configured to be capable of changing a position of the second-axial-direction support member on a parallel plane parallel to the spindle direction and the first axial direction.

* * * * *